(12) United States Patent
Eyer

(10) Patent No.: US 10,681,147 B2
(45) Date of Patent: Jun. 9, 2020

(54) URLS FOR ACQUIRING OR TRANSMITTING DATA

(71) Applicant: Saturn Licensing LLC, New York, NY (US)

(72) Inventor: Mark Eyer, Washington, DC (US)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 15/237,083

(22) Filed: Aug. 15, 2016

(65) Prior Publication Data

US 2018/0048719 A1    Feb. 15, 2018

(51) Int. Cl.
| | |
|---|---|
| *H04L 29/06* | (2006.01) |
| *H04L 29/08* | (2006.01) |
| *H04L 29/12* | (2006.01) |
| *H04H 20/93* | (2008.01) |

(52) U.S. Cl.
CPC .......... *H04L 67/146* (2013.01); *H04H 20/93* (2013.01); *H04L 61/1511* (2013.01); *H04L 61/304* (2013.01); *H04L 61/3085* (2013.01); *H04L 65/4023* (2013.01); *H04L 67/1095* (2013.01); *H04L 67/34* (2013.01)

(58) Field of Classification Search
CPC ........ H04L 67/146; H04L 67/32; H04L 67/10
See application file for complete search history.

(56) References Cited

U.S. PATENT DOCUMENTS

| | | | |
|---|---|---|---|
| 7,136,932 B1 | 11/2006 | Schneider | |
| 7,216,170 B2* | 5/2007 | Ludvig | H04N 21/2221 |
| | | | 375/E7.024 |
| 2007/0118620 A1* | 5/2007 | Cartmell | G06F 17/30887 |
| | | | 709/219 |
| 2008/0016142 A1* | 1/2008 | Schneider | H04H 20/93 |
| | | | 709/203 |
| 2010/0040048 A1 | 2/2010 | Vormisto | |
| 2011/0289530 A1* | 11/2011 | Dureau | H04N 21/4622 |
| | | | 725/38 |
| 2014/0150022 A1 | 5/2014 | Oh et al. | |
| 2015/0052570 A1 | 2/2015 | Lee et al. | |
| 2015/0201039 A1* | 7/2015 | Schneider | G06Q 10/06 |
| | | | 709/217 |

(Continued)

OTHER PUBLICATIONS

"System Discovery and Signaling", A/321, Advanced Television Systems Committee (ATSC), Washington D.C., Doc. A/321 :2016, Mar. 23, 2016, pp. 1-28.

(Continued)

*Primary Examiner* — Nicholas R Taylor
*Assistant Examiner* — Sanjoy K Roy
(74) *Attorney, Agent, or Firm* — Oblon, McClelland, Maier & Neustadt, L.L.P.

(57) ABSTRACT

A method, reception apparatus, and computer-readable medium for communicating with a server to download or upload data. The method includes acquiring a URI (Uniform Resource Identifier) message that includes a DNS (Domain Name System) name registered with the IANA (Internet Assigned Numbers Authority). A URL (Uniform Resource Locator) is generated based on the registered DNS name in the acquired URI message and a predetermined domain name. The data is downloaded from, or uploaded to, the server using the generated URL.

20 Claims, 8 Drawing Sheets

(56) References Cited

U.S. PATENT DOCUMENTS

2015/0256903 A1* 9/2015 Walker ............. H04N 21/23614
                                                      725/32
2016/0360269 A1* 12/2016 An ..................... H04N 21/462

OTHER PUBLICATIONS

"Signaling, Delivery, Synchronization, and Error Protection", A/331, Advanced Television Systems Committee (ATSC), Washington D.C., Doc. S33-174r3, Jun. 21, 2016, pp. 1-134.
"Audio Watermark Emission", A/334, Advanced Television Systems Committee (ATSC), Washington D.C., Doc. S33-160r3, Apr. 26, 2016, pp. 1-6.
"Service Announcement", A/332, Advanced Television Systems Committee (ATSC), Washington D.C., Doc. S33-159r1, Nov. 24. 2015, pp. 1-28.
"Link-Layer Protocol", A/330, Advanced Television Systems Committee (ATSC), Washington D.C., Doc: S33-169r5, Jul. 5, 2016, pp. 1-48.
"Service Usage Reporting", A/333, Advanced Television Systems Committee (ATSC), Washington D.C., Doc. S33-170r3, May 16, 2016, pp. 1-16.
"Video Watermark Emission", A/335, Advanced Television Systems Committee (ATSC), Washington D.C., Doc. S33-156r3, Mar. 22, 2016, pp. 1-15.
International Search Report and Written Opinion dated Nov. 9, 2017 in PCT/US2017/046331.
Extended European Search Report dated Jul. 9, 2019 in European Application No. 17841896.8.
Hardaker Parsons W et al: "Anonymizing and privatizing requests and responses in the DNS; draft-hardaker-dnse-split- key-dns-00. txt", Internet Engineering Task Force, IETF; Standard Working Draft, Internet Society (ISOC) 4, Rue Des Falaises Ch- 1205 Geneva, Switzerland, Apr. 1, 2014 (Apr. 1, 2014), pp. 1-6, XP015098476.
Anonymous: "Reverse DNS lookup—Wikipedia", Aug. 14, 2016 (Aug. 14, 2016), pp. 1-3, XP055601206, URL:https://en.wikipedia.org/w/index.php? title=Reverse_DNS_lookup&oldid= 734435759.

* cited by examiner

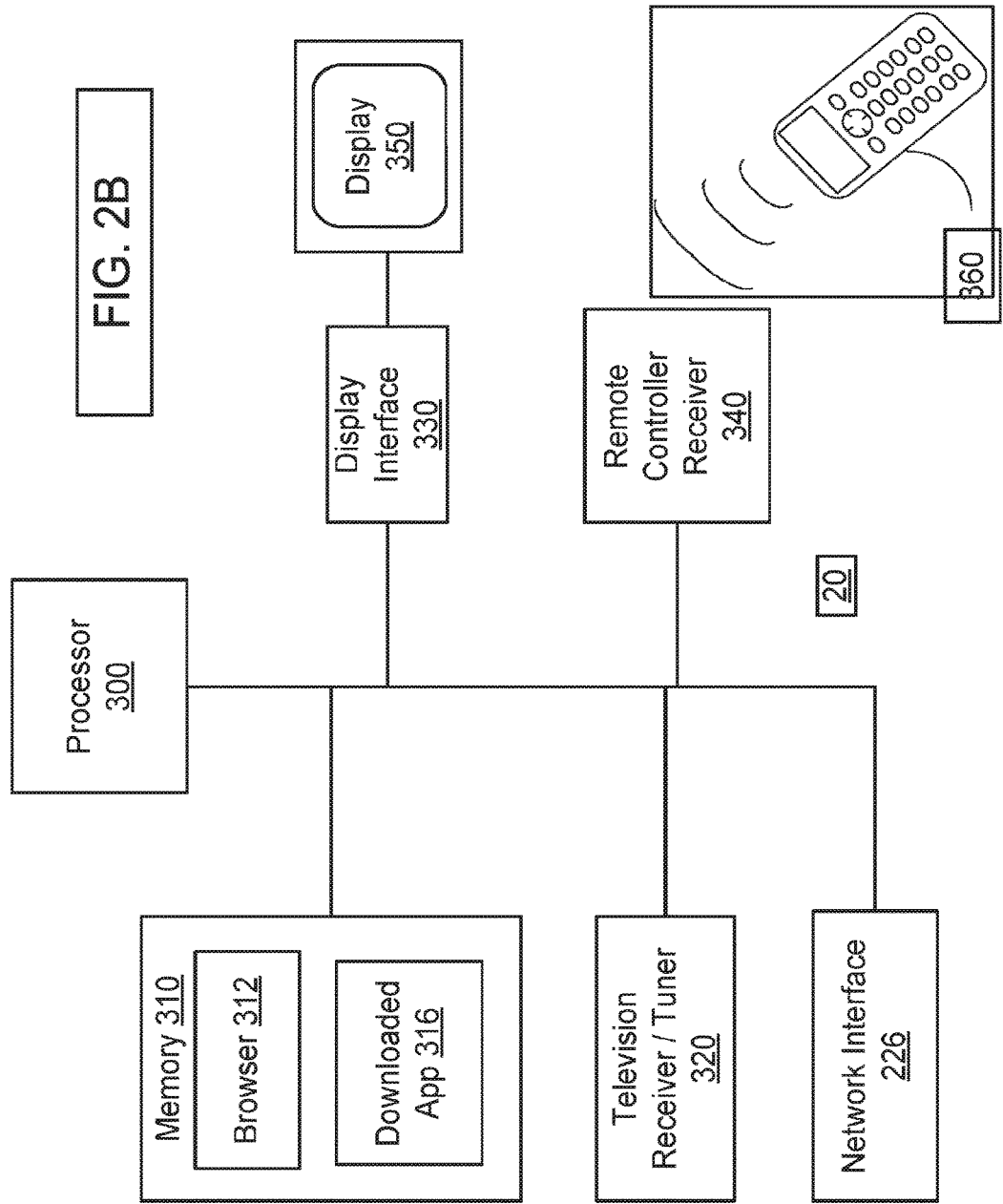

| Syntax | No. of Bits | Format |
|---|---|---|
| uri_message() { | | |
|   uri_type | 8 | uimsbf |
|   entity_strlen  /* N1 | 8 | uimsbf |
|   entity_string() | 8*N1 | |
|   uri_strlen  /* N2 | 8 | uimsbf |
|   URI_string() | 8*N2 | |
| } | | |

FIG. 5A

| uri_type Value | Meaning |
|---|---|
| 0x00 | Reserved |
| 0x01 | Signaling Server (providing access to the Service Layer Signaling (SLS), as specified in Section 7 of A/331 [1]). |
| 0x02 | ESG data server (providing access to the ESG data, as specified in A/332 [2]). |
| 0x03 | URL of Service Usage Data Gathering Report server (for use in reporting service usage, as specified in A/333 [3]). |
| 0x04 | Emergency Information Server |
| 0x05 | Application Manifest Server |
| 0x06-0xFF | Reserved |

FIG. 5B

URLS FOR ACQUIRING OR TRANSMITTING DATA

BACKGROUND OF THE INVENTION

Field of the Invention

Embodiments described herein relate generally to URLs (Uniform Resource Locators) that are used to acquire or transmit data.

Background

Modern televisions are capable of accessing and presenting content from various sources (e.g., broadcast and Internet sources). However, accessing content over the Internet based on URLs delivered, for example, in the broadcast signal increases the risk of malicious or otherwise unauthorized content being accessed by the television.

The foregoing "Background" description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art against the present disclosure. The foregoing paragraphs have been provided by way of general introduction, and are not intended to limit the scope of the following claims. The described embodiments, together with further advantages, will be best understood by reference to the following detailed description taken in conjunction with the accompanying drawings.

SUMMARY OF THE INVENTION

According to an embodiment of the present disclosure, there is provided a method of a reception apparatus for communicating with a server to download or upload data. The method includes receiving a URI (Uniform Resource Identifier) message that includes a DNS (Domain Name System) name registered with the IANA (Internet Assigned Numbers Authority). A URL (Uniform Resource Locator) is generated based on the registered DNS name in the received URI message and a predetermined domain name. The data is downloaded from, or uploaded to, the server using the generated URL. The predetermined domain name includes a top-level domain name and a second-level domain name of the URL.

Further, according to an embodiment of the present disclosure, there is provided a non-transitory computer-readable medium storing instructions which when executed by a computer causes the computer to perform the method for communication with the server to download or upload data, as described above.

Further, according to an embodiment of the present disclosure, there is provided a reception apparatus, including circuitry configured to receive a URI message that includes a DNS name registered with the IANA. The circuitry generates a URL based on the registered DNS name in the received URI message and a predetermined domain name. Further, the circuitry downloads the data from, or uploads the data to, the server using the generated URL. The predetermined domain name includes a top-level domain name and a second-level domain name of the URL.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 2B is a processor-centric block diagram of an exemplary reception apparatus;

FIGS. 5A and 5B illustrate a URI message according to one embodiment;

DETAILED DESCRIPTION

Figure 1:
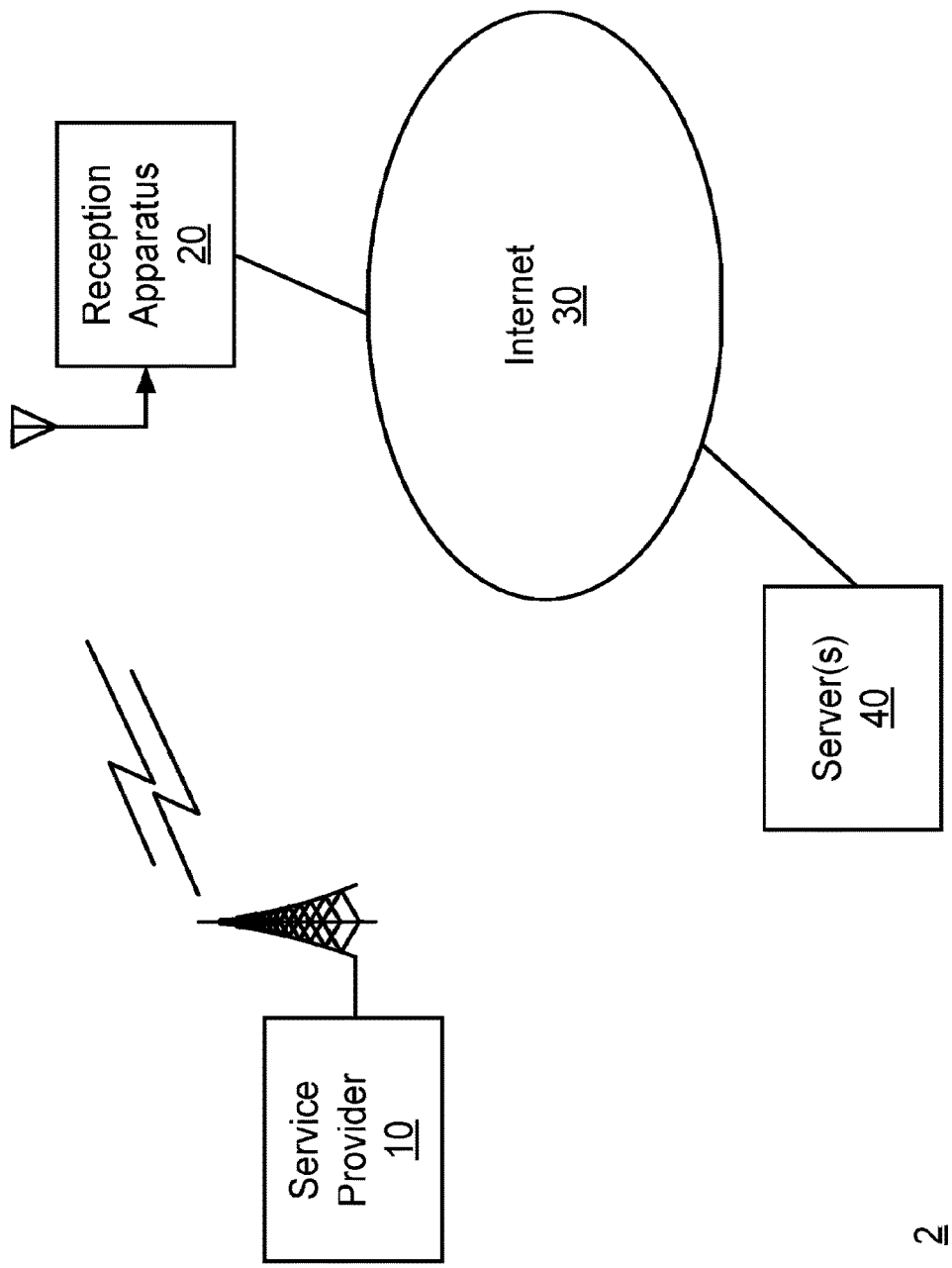
FIG. 1 illustrates an exemplary content distribution system.

While the present disclosure is susceptible of embodiment in many different forms, there is shown in the drawings and will herein be described in detail specific embodiments, with the understanding that the present disclosure of such embodiments is to be considered as an example of the principles and not intended to limit the present disclosure to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a program module, a script, a function, a procedure, an object method, an object implementation, in an executable application, an applet, a servlet, a source code, an object code, a shared library/ dynamic load library and/or other sequence of instructions designed for execution on a computer system.

The term "program", as used herein, may also be used in a second context (the above definition being for the first context). In the second context, the term is used in the sense of a "television program". In this context, the term is used to mean any coherent sequence of audio/video content such as those which would be interpreted as and reported in an (EPG) electronic program guide or (ESG) electronic service guide as a single television program, without regard for whether the content is a movie, sporting event, segment of a multi-part series, news broadcast, etc. The term may also be interpreted to encompass commercial spots and other program-like content which may not be reported as a program in an EPG or ESG.

Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Embodiments of the present disclosure are directed to downloading (or otherwise acquiring) data from, or uploading (or otherwise transmitting) the data to, a server based on a URL. In one embodiment, the URL is defined in or determined based on URL information received by a reception apparatus (e.g., a television). For example, the URL information is delivered with content (e.g., broadcast television content) that is processed for display to a user. The URL information may be delivered in audio or video watermarks embedded in the content itself, closed captioning, or other portions of a broadcast emission. URL information may also be provided in information downloaded from a server or received from other external sources in certain embodiments. The URL, in certain embodiments, references an object, file, or any other data to be downloaded from a broadband server or references a server to which data (e.g., user information) is to be uploaded.

At the user side, problems may arise if an unauthorized party is able to tamper with the URL information that is used by the reception apparatus to download or upload data. For example, an unauthorized party could tamper with an audio or video watermark, or the content (e.g., by inserting a new unauthorized watermark), before it arrives at the reception apparatus by placing a box between a set-top box and the reception apparatus to intercept and alter an HDMI (High-Definition Multimedia Interface) signal. Such tampering could result in the reception apparatus accessing content (e.g., malicious executable code) that was not authorized by a broadcaster of the content, or reporting data (e.g., user information) to an unauthorized party.

Unauthorized parties, in some scenarios, can tamper with a broadcast signal and re-distribute it to a number of reception devices in a local area. Such tampering can include alteration of watermarks carrying URL information.

In certain embodiments, to reduce the risk of the reception apparatus using a URL that has been tampered with and communicating with an unauthorized server, the reception apparatus generates the URL based in part on URL information that is received from an external source. For example, the URL is also generated based on predetermined URL information such as a predetermined domain name, which directs the reception apparatus to a trusted domain name or server. This limits an unauthorized party's ability to tamper with a URL to direct the reception apparatus to an unauthorized server.

Further, to avoid conflicts and ensure communication with the correct server, the URL should contain unique identification information. In certain embodiments, the identified information is globally unique to allow reception apparatuses to operate world-wide. The globally unique identification information may be included in the URL information delivered with the content.

To ensure globally unique identification information, one option is to rely on a registration authority that is already responsible for managing the assignment of unique values. In one embodiment of the present disclosure, a registered DNS (Domain Name System) name is used to generate the URL to avoid the need for a separate registration authority, as the IDNS (Internet Domain Name System) offers a globally-valid registration mechanism. In other embodiments, the URL information includes other globally unique and/or registered values such as an IPv4 (Internet Protocol version 4) address, an IPv6 (Internet Protocol version 6) address, a CA (Certificate Authority) certificate serial number, or unique characteristics of the content (such as a fingerprint).

Referring now to the drawings, FIG. 1 is a block diagram that shows an exemplary content distribution system 2. The content distribution system 2 includes a service provider 10, a reception apparatus 20, and one or more servers 40. The reception apparatus 20 accesses the one or more servers 40 via one or more communication networks such as the Internet 30.

The service provider 10, which may be a broadcaster entity, station, or other content provider, provides content and/or other services to the reception apparatus 20 via a terrestrial broadcast according to one embodiment. In other embodiments, the service provider 10 provides the content and/or other services via at least one of a satellite broadcast, a cable television transmission, the terrestrial television broadcast, cellular network, and data communication network such as a local area network (LAN), wide area network (WAN), or the Internet 30. The content provided by the service provider 10 includes one or more television programs, without regard to whether the content is a movie, sporting event, segment of a multi-part series, news broadcast, etc. Further, the content provided by the service provider 10 may also include advertisements, infomercials, and other program-like content which may not be reported as a program in an EPG or ESG. The service provider 10 may also provide content that contains only audio or only video.

The content, service, or broadcast stream is associated with URL information in certain embodiments, and may be provided in an audio or video watermark in certain embodiments. For example, the URL information may be embedded in an audio signal, as specified in ATSC Candidate Standard: Audio Watermark Emission (A/334—Doc. S33-160r1, 27 Nov. 2015), or embedded in transmitted pixels of a video signal, as specified in ATSC Candidate Standard: Video Watermark Emission (A/335—Doc. S33-156r1, 30 Nov. 2015). ATSC A/334 and A/335 are incorporated herein by reference in their entirety.

In one embodiment, the service provider 10 includes a transmission apparatus with a transmitter that is configured to transmit one or more services (e.g., including content) to the reception apparatus 20. The transmitter may include a source encoder, a channel encoder, and a modulator. The source encoder may include data, audio, and video encoders to compress the audio, video, signaling, control or other data received from a source. The channel encoder may randomize, interlace, channel code, and frame map the compressed and signaling data. For example, the channel encoder may include a frame builder that forms many data cells into sequences to be conveyed on OFDM (Orthogonal frequency-division multiplexing) symbols. The modulator (multiplexer) converts the processed digital data into modulation symbols, which can be, for example OFDM symbols (e.g., in the case of the proposed ATSC 3.0 standard). The multiplexed data is then passed to an inverse fast Fourier transformer (IFFT) which transforms a frequency domain signal into a time domain signal. The time domain signal is fed to a guard insertion module for generating a guard interval (GI) between symbols and then to a digital to analog (D/A) converter. Then, antenna 104 may perform up-conversion, RF amplification and over-the air broadcasting. In other embodiments, some of the components of the transmission apparatus or the reception apparatus 20 may not be necessary. For example, the antennas are not required when the transmission system is not over-the-air but over cable. Details of an exemplary OFDM transmitter and receiver may be found, for example, in the DVB-T2 standard (ETSI EN 302 755), ATSC Proposed Standard: Physical Layer Protocol (A/322—Doc. 532-230r56, 29 Jun. 2016), and ATSC Standard: A/321, System Discovery and Signaling (Doc. A/321:2016, 23 Mar. 2016), which are incorporated herein by reference in their entirety.

The reception apparatus 20 may be a television set, mobile handset, personal video recorder, set-top box, or other device configured to receive the content (other service) from the service provider 10. In one embodiment, each reception apparatus 20 includes an antenna to receive the content. The reception apparatus 20 includes reception circuitry, as illustrated for example in FIG. 2A. The reception apparatus 20 may also be included in a vehicle or a computer. The reception apparatus 20 processes the content provided by the service provider 10 and displays the content on a display (e.g., a liquid crystal or organic light-emitting diode display), for example the display 350 illustrated in FIG. 2B. The display 350 may be an integral part of the reception apparatus 20 such as a television set. Alternatively, the display 350 may be external to the reception apparatus 20 such as a television set connected to a set top box.

The reception apparatus 20 generates a URL based on the URL information to communicate with one or more servers 40 to download or upload data. For example, the reception apparatus 20 uses the generated URL to access a signaling server, which provides signaling metadata (e.g., MPDs (Media Presentation Descriptions), AEIs (Application Event Information) for requested service(s)) needed to access and present supplementary content). Desired signaling metadata objects may be indicated by appended path terms in the generated URL. Examples of metadata object types include those specified in ATSC Candidate Standard: Signaling, Delivery, Synchronization, and Error Protection (A/331—Doc. S33-174r3, 21 Jun. 2016), which is incorporated herein by reference in its entirety.

The MPD corresponds to a linear service of a given duration defined by the service provider 10 (e.g., a single television program, or the set of contiguous linear television programs over a period of time). The contents of the MPD provide the resource identifiers for segments and the context for the identified resources within a MP (media presentation).

The one or more servers 40, in certain embodiments, provide the data to be downloaded by the reception apparatus 20 or receive the data to be uploaded by the reception apparatus 20. The one or more servers 40 may include a signaling server, an electronic service guide server, a service usage data gathering report server, an emergency information server, an application server, an application manifest server, or other data servers.

The signaling server may be a Service Layer Signaling server, as specified in A/331. The Service Layer Signaling server provides access to the Service Layer Signaling, as defined in Section 7 of A/331. The electronic service guide server may provide access to service guide data, as specified in ATSC Candidate Standard: Service Announcement (A/332-Doc. 533-159r1, 24 Nov. 2015), which is incorporated herein by reference in its entirety.

The service usage data gathering report server may be operated by (or on behalf of) service providers, either individually or in groups, and as specified in ATSC Candidate Standard: Service Usage Reporting (A/333—Doc. 533-170r3, 16 May 2016), which is incorporated herein by reference in its entirety. The reception apparatus 20, in one embodiment, reports service usage data to the service usage data server when a URL to be used for transmitting the service usage data, or URL information that can be used to generate the URL, is provided to the reception apparatus 20.

The application server may store one or more applications to support app-based enhancements to a linear service (e.g., television program). In one embodiment, the application is an HTML5 app that can be executed by a browser in the reception apparatus 20. The app-based enhancement may be an app that runs in the background and manages the insertion of targeted ads or a collection of apps that provide an interactive viewing experience to enhance the audio/video program. In one embodiment, the application is executed in synchronization with the display of the content. The emergency information server may store emergency alert information (e.g., a message based on CAP (Common Alerting Protocol) message). The OASIS CAP standard (Common Alerting Protocol Version 1.2, 1 Jul. 2010), is incorporated herein by reference in its entirety. The application manifest server may store a manifest file that identifies application packages (e.g., an HTML5 app and images).

For a streaming A/V (audio/video) channel, the service usage data may identify one or a combination of a reporting interval during which a service is accessed, a service identifier, the time the service access started, and the time the service access ended. Further, if any applications were active during the report interval, the service usage data also records when the applications are active (whether on a primary device or a "second screen", companion device), including the application identifier, the time the application started being active, and the time it stopped being active.

Figure 2A:
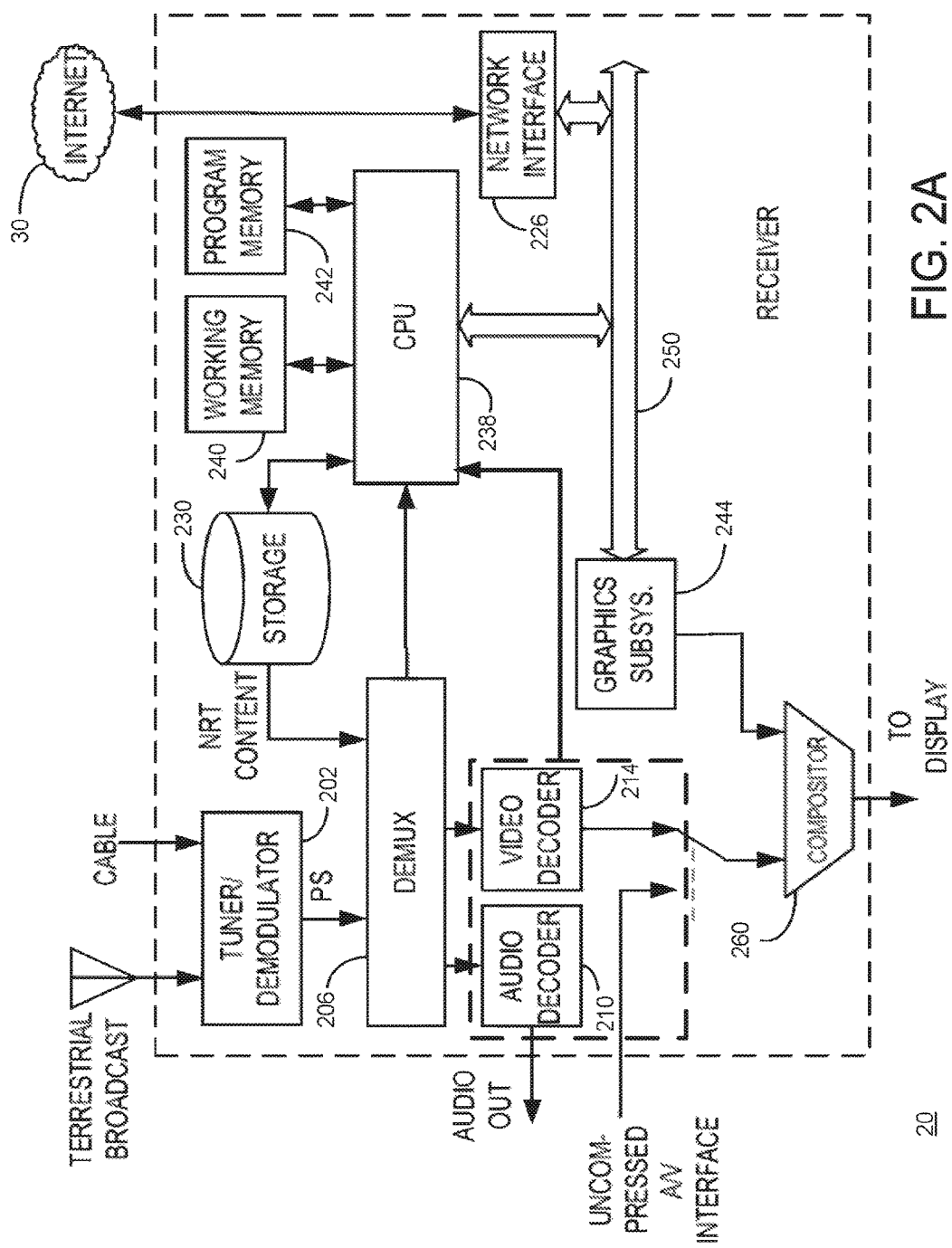
FIG. 2A is a block diagram of an exemplary reception apparatus.

FIG. 2A illustrates an embodiment of the reception apparatus 20. The reception apparatus 20 may be implemented in or connected to a fixed device such as a television set or desktop computer, or a mobile device such as a device on a vehicle, a portable computer, smart phone, tablet, etc. In certain embodiments, the reception apparatus 20 is a digital television receiver device that may be incorporated into a television set or a set top box connected to the television set.

The reception apparatus 20 includes a tuner/demodulator 202, which receives content from one or more service providers via a terrestrial broadcast or a cable television transmission. The reception apparatus 20 may also, or alternatively, receive content from a satellite broadcast. The tuner/demodulator 202 receives a packet stream (PS) such as a transport stream (TS) or IP packet stream, which is demultiplexed by the demultiplexer 206 into audio and video (A/V) streams. Exemplary IP packet streams are described in the ATSC Mobile DTV standard ATSC-MIH (A/153), the Enhanced Multicast Multimedia Broadcast (eMBMS) standard 3GPP: TS 26.346 V12.4.0 (2014-12), "3rd Generation Partnership Project; Technical Specification Group Services and System Aspects; Multimedia Broadcast/Multicast Service (MBMS); Protocols and codecs (Release 12), ATSC Proposed Standard: A/322, and ATSC Candidate Standard: Link-Layer Protocol (A/330—Doc. S33-169r5, 5 Jul. 2016), which are incorporated herein by reference in their entirety. The audio is decoded by an audio decoder 210 and the video is decoded by a video decoder 214.

Further, uncompressed A/V data may be received via an uncompressed A/V interface (e.g., a HDMI interface) that can be selectively utilized. The uncompressed A/V data may be received from a set-top box, digital video recorder, DVD player, or any other consumer electronics device connected to the reception apparatus 20 via the uncompressed A/V interface.

In certain embodiments, the uncompressed A/V data contains audio/video watermarks embedded therein. The watermarks are used to provide URL information to allow the reception apparatus 20 to communicate with a server to download or upload data.

In addition to content, the IP packet stream may include the URL information separately, caption data, alternate content (e.g., alternate advertisements), one or more MPDs, broadcast and/or other applications, metadata, etc. One or more of the content, the URL information, the caption data, the alternate content, the one or more MPDs, the broadcast and/or other applications, metadata, etc. may also be receivable via the Internet 30 and a network interface 226. In certain embodiments, the caption data, or other metadata, in addition to the URL information, is embedded and otherwise inserted in an audio and/or video portion of the content. A CPU (Central Processing Unit) 238 extracts the embedded information from the audio and/or video portions of the content and performs one or more processes (e.g., generation of a URL) based on the extracted information.

A storage unit 230, such as a hard disc drive or solid state memory, is provided to store the alternate content or other recorded content. The alternate or stored content can be played by demultiplexing the content stored in the storage unit 230 by the demultiplexer 206 in a manner similar to that of other sources of content. The storage unit 230 may also store downloaded applications (e.g., downloaded from the Internet) in certain embodiments.

The reception apparatus 20 generally operates under control of at least one processor, such as the CPU 238, which is coupled to a working memory 240, program memory 242, and a graphics subsystem 244 via one or more buses (e.g., bus 250). The CPU 238 receives closed caption data from the demultiplexer 206 as well as any other information such as EPGs or ESGs used for rendering graphics, and passes the information to the graphics subsystem 244. Graphics outputted by the graphics subsystem 244 are combined with video images by the compositor and video interface 260 to produce an output suitable for display on a video display.

Further, the CPU 238 operates to carry out functions of the reception apparatus 20 including, for example, one or a combination of generation of the URL to download or upload data, controlling the download or upload of the data, execution of a downloaded application, other processing related to the downloaded data such as processing of an MPD to present a media presentation, etc.

Although not illustrated in FIG. 2A, the CPU 238 may be coupled to any one or a combination of the reception apparatus 20 resources to centralize control of one or more functions. In one embodiment, the CPU 238 also operates to oversee control of the reception apparatus 20 including the tuner/demodulator 202 and other television resources.

A more processor-centric view of the reception apparatus 20 is illustrated in FIG. 2B. Memory and storage 230, 240, and 242 are depicted collectively as memory 310. Further, a processor 300 includes one or more processing units such as CPU 238. Similarly, the various demodulators, decoders, etc., that initially process digital television signals are collectively depicted as television receiver/tuner 320. The reception apparatus 20 further includes a remote controller 360 which communicates with a remote controller receiver interface 340. Additionally, the display 350 is connected to a display interface 330, which includes for example the uncompressed A/V interface and/or compositor 260, and is either a display integral to the reception apparatus 20 as in a television set or a connected display device as in the case where the reception apparatus 20 is integrated into a set-top box.

Memory 310 contains various functional program modules and data. The memory 310 stores the data used by the reception apparatus 20. The memory 310 within the reception apparatus 20 can be implemented using disc storage form as well as other forms of storage such as non-transitory storage devices including for example network memory devices, magnetic storage elements, magneto-optical storage elements, flash memory, core memory and/or other non-volatile storage technologies. The term "non-transitory" is a limitation of the medium itself (i.e., tangible, not a signal) as opposed to a limitation on data storage persistency (e.g., RAM vs. ROM).

When an application 316 is received (e.g., downloaded using the generated URL), the application 316 is stored in the memory 310. The application 316 is executed by the processor 300 (e.g., using browser 312, such as an HTML5 browser), for example, in response to a trigger or other timing information associated with the application 316 or corresponding content. In one embodiment, the application 316 may execute in response to a user request. The application 316 may cause the processor 300 to output supplementary content for concurrent display with the content already being displayed to the user.

Figure 3:
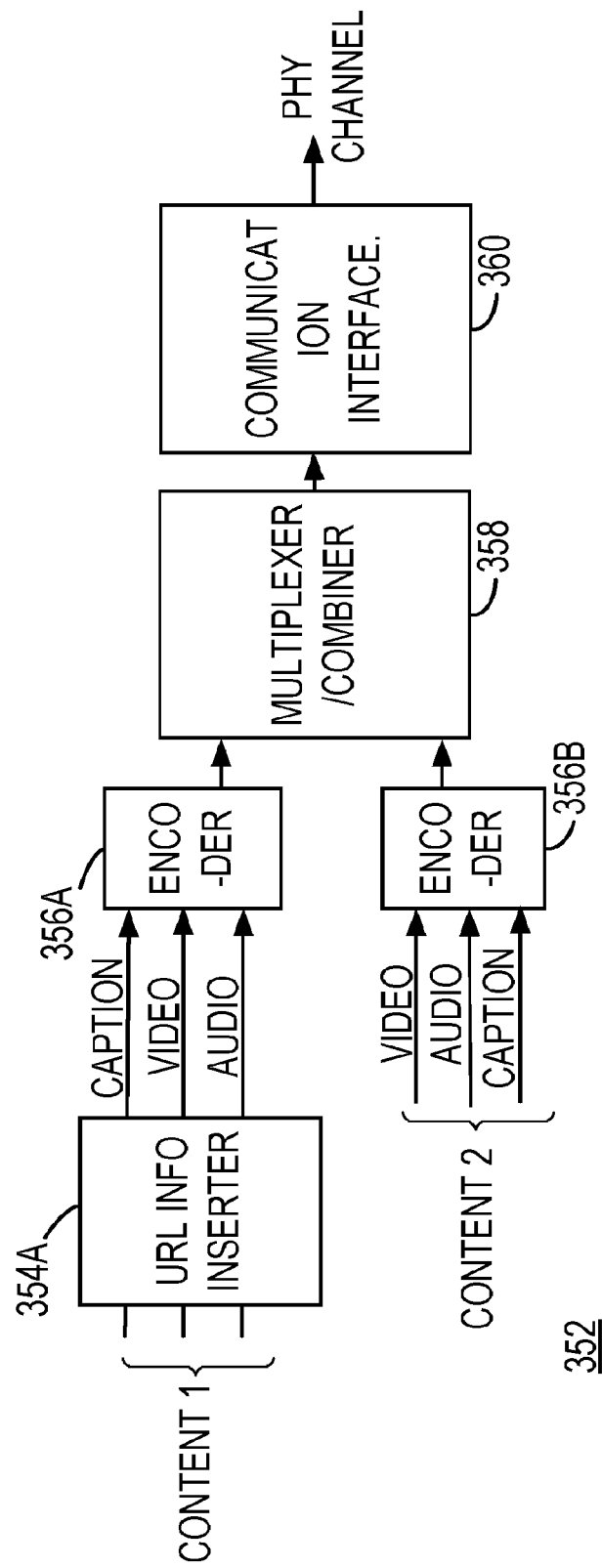
FIG. 3 illustrates an exemplary information providing apparatus.

FIG. 3 is a basic diagram of an exemplary information providing apparatus 352, which for example is utilized by the service provider 10. Generally speaking, a single service provider may provide a plurality of content, (e.g., multiple programs), over one or more transport streams or IP packet streams. For example, audio, video, and caption data for content 1 are provided to an encoder 356A while audio, video, and caption data for content 2 are provided to an encoder 356B. A transport stream multiplexer/combiner 358 receives the outputs from the encoders 356A, 356B and provides an output that can be distributed via a physical channel medium such as a terrestrial, cable, or satellite broadcast. A communication interface 360 (e.g., a broadcast transmitter) distributes the output from the transport stream multiplexer/combiner 358 via the physical channel medium.

In certain embodiments, the information providing apparatus 352 includes a URL information inserter 354A. The URL information inserter 354A is configured to insert the URL information in a caption, audio, or video portion of the content 1. In one embodiment, the URL information inserter 354A inserts an audio watermark in the audio portion and/or a video watermark in the video portion of the content 1. In another embodiment, the URL information is pre-inserted into the caption, audio, or video portions before the content 1 is provided to the information providing apparatus 352.

Figure 4:
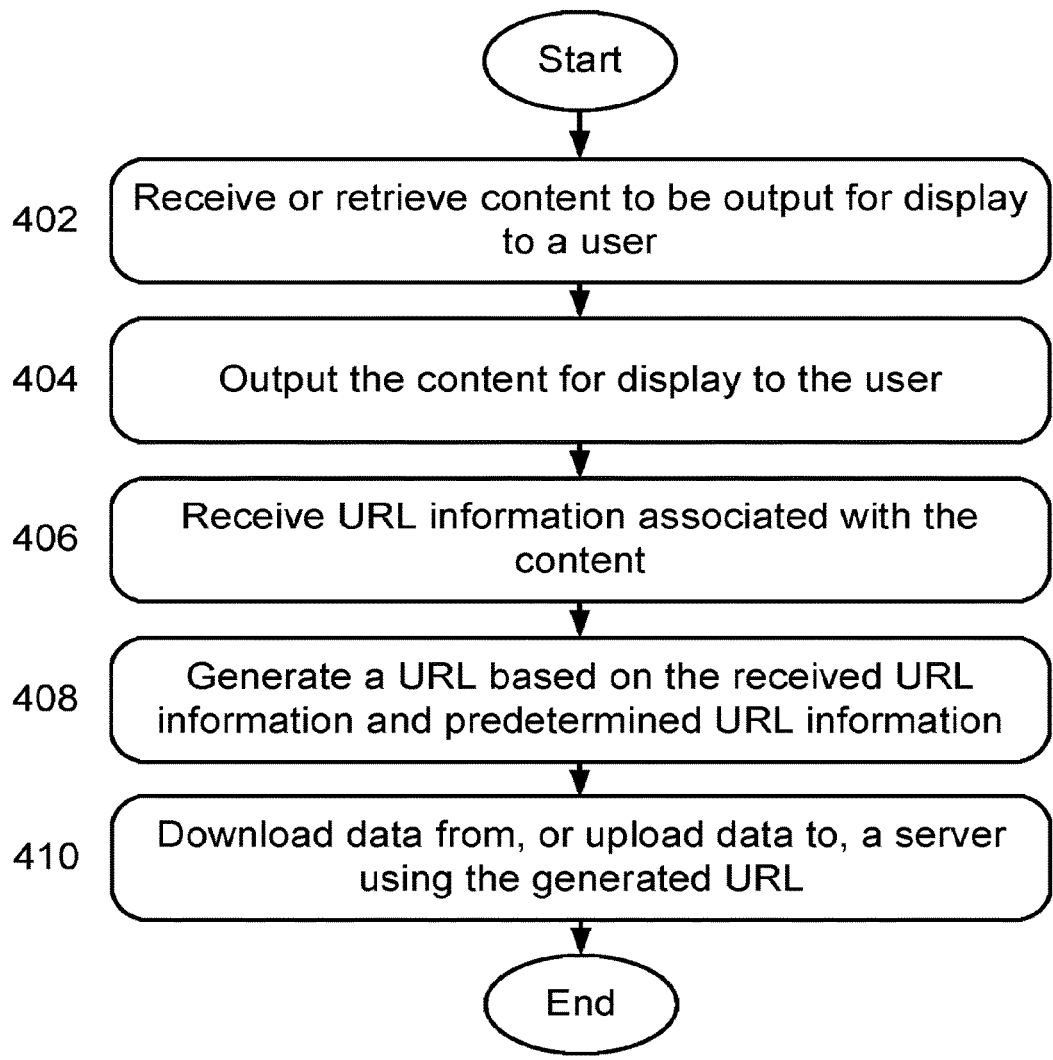
FIG. 4 illustrates a method for communicating with a server to download or upload data according to one embodiment.

FIG. 4 provides an overview of an exemplary method of the reception apparatus 20 for communicating with a server to download (or otherwise acquire) or upload (or otherwise transmit) data. The data to be downloaded or uploaded may be associated with content that is processed for display to a user. The reception apparatus 20 communicates with the server using a URL that is constructed using predetermined URL information and URL information received from an external source (e.g., the service provider via a digital television broadcast or a server via the Internet).

The URL may direct the reception apparatus 20 to a signaling server to download data needed to access and/or present supplementary content, an electronic service guide data server to download service guide information, a service usage data gathering report server to upload service usage information, an application server to download applications that are to be executed, for example concurrently or in synchronization with content that is displayed to a user, an emergency information server to download emergency alert information, and/or an application manifest server to download a manifest file that identifies application packages for download.

In step 402, the reception apparatus 20 receives (or otherwise retrieves, e.g., in the case of previously recorded or downloaded content) the content to be output for display to the user. In one embodiment, the tuner/demodulator 202 of the reception apparatus 20 receives a digital television broadcast signal including one or more services containing AN content (e.g., audio or television programming). The tuner/demodulator 202 tunes to a broadcast channel to receive the digital television broadcast signal in response to, for example, a television channel selection by the user using the remote controller 360. Further, the demultiplexer 206 may select the content from the one or more services in response to the television channel selection. In other embodiments, the content may be received via an uncompressed A/V interface (e.g., an HDMI interface) or the network interface 226, etc. The content may also have been previously recorded or downloaded to the storage 230.

When the content in compressed, the content is processed (e.g., decoded) by any one or a combination of the audio decoder 210, the video decoder 214, and the CPU 238. The uncompressed or processed content is output for display to the user in step 404. In step 406, the reception apparatus 20 receives URL information, which may be associated with the content. As described above, the URL information may be embedded as an audio or a video watermark in the content. In one embodiment, the CPU 238 of the reception apparatus 20 receives the uncompressed or decoded audio and/or video of the content to determine if a watermark is embedded therein. When a watermark is detected, the CPU 238 processes the watermark to extract the URL information.

In one embodiment, the URL information is included in a URI message as illustrated in FIG. 5A. However, the URL information may be included in other types of messages such as a trigger for downloading an application, a service list table including URL information to make HTTP requests for signaling metadata, and an emergency alert message for delivering emergency alert information and including URL information to retrieve emergency alert information.

The URL information includes information that the reception apparatus 20 uses to generate, in step S408, the URL for communicating with the server. In one embodiment, the URL information includes a DNS name registered with the IANA. In other embodiments, the URL information includes other globally unique and registered values such as an IPv4 address, an IPv6 address, or a CA certificate serial number. Since DNS names or the other globally unique values registered by the respective registration authorities are globally unique, this fulfills the requirement that the generated URL be globally unique. For example, the URL information may include the DNS name, IP address, or CA certificate serial number of the originator of the watermark and/or the provider of the content.

The use of a registered name or value provides a further layer of security as a result of the process for registering the name or value itself. For example, in order to register a domain name with the IANA, information such as a contact person, e-mail address, and telephone number need to be provided to the registration entity. Thus, even if a third party were to register a domain name to conduct unauthorized activities, a record generated from the initial registration process would be available.

The URL is generated in step 408 based on the received URL information and the predetermined URL information. The URL may be generated by the CPU 238 of the reception apparatus 20. In one embodiment, the rule for formation of the URL is:

https://<entity>.vp1.tv/<URI_string( )>

In this case, <entity> is a domain name included in the received URL information and registered with the IANA (or other unique value), for example by the originator or provider of the content or watermark. It should be noted that these domain names need not be human-friendly names. For example, six-character domain names such as "x-0.co" are available.

In this embodiment, "vp1.tv" corresponds to the predetermined URL information. However, other registered domain names may be used in other embodiments. The predetermined URL information is hard coded in the reception apparatus 20 according to one embodiment. In other embodiments, limited access may be provided to update the predetermined URL information, for example via firmware updates to the reception apparatus 20.

The predetermined URL information corresponds to a top-level domain name and a second-level domain name of the generated URL. The received URL information may correspond to at least one lower-level domain name of the generated URL that is subordinate to the second-level domain name. For example, when <entity> is a registered DNS name such as "fbc.com", the registered DNS name includes a third-level ".com" and fourth-level "fbc" domain name. In another example, when <entity> is a string such as "fbc-com" which is not separated by a period, the string only includes a third-level domain name. Thus, the generated URL directs the reception apparatus 20 to a server whose IP address is established by the operator of the predetermined URL (e.g. "vp1.tv"). For example, the IP address and subdomain is provided to the operator of the predetermined URL. The operator then sets up a redirect for the subdomain to the provided IP address by updating its DNS record (e.g., the DNS record for "vp1.tv"). This reduces the risk of the reception apparatus 20 being directed to an unauthorized server. Further, the same server acts as a gatekeeper so that even if a malevolent third party were to register a domain name with that server, the registered domain name can be invalidated in a timely and efficient manner. Further, the predetermined URL may be used in one or more other levels of the domain name of the generated URL in other embodiments.

URI_string( ) may identify or otherwise correspond to the specific content associated with the URL information. For example, the URI_string( ) identifies a path or paths to a file on the identified server in which the data is stored or a web address where files are to be uploaded.

In step 410, the reception apparatus 20 communicates with the server using the URL generated in step 408 to download or upload data. For example, the reception 20 communicates with the server via the Internet using the network interface 226. The reception apparatus 20 downloads the file or data stored at the location designated by the URL and/or uploads data from the reception apparatus 20 to the file or location designated by the URL.

In one embodiment, the reception apparatus 20 further determines whether to download or upload data based on a URL information type (e.g., the URI type in the URI message) provided with or in the URL information. For example, URI type value 0x01 may indicate that the URL is for a signaling server, URI type value 0x02 may indicate that the URL is for an electronic service guide server, URI type value 0x03 may indicate that the URL is for a service usage data gathering report server, URI type value 0x04 may indicate an emergency information server, and 0x05 may indicate an application or application manifest server, as described above. The reception apparatus 20 may download the file or data stored at the location designated by the URL for the signaling server, service guide server, emergency information server, application server, or application manifest server. The reception apparatus 20 may upload data to the location or file designated by the URL for the service usage data gathering report server.

When data is downloaded in step 410, the reception apparatus 20 processes the downloaded data. For example, when the data is downloaded from a signaling server, the data may include service signaling files or application-based enhancement signaling information (e.g., pertaining to the delivery of app-based enhancement components, such as an application logic file, locally-cached media files, a network content item, or a notification stream). The reception apparatus 20 may further download data (e.g., the app-based enhancement components) identified in the data downloaded from the signaling server. In another example, emergency alert information may be presented to a user based on an acquired emergency alert message.

In one embodiment, the service guide server provides service guide data regarding content and services being delivered, or scheduled for delivery, by the service provider 10. The reception apparatus 20 may provide an on-screen Service Guide based on the service guide data to allow a user to view and select from scheduled, on-demand, and/or other data services being provided by the service provider 10. The services may be a broad range of broadcast services, including scheduled television services, data services, and on-demand services. The service guide information provides descriptions of the content offerings and may also provide a filtering capability based on user preferences and content properties, such as the presence or absence of captioning, interactive enhancements, video formats (3D, SD, HD, LTD), audio formats (stereo, 5.1, immersive), content advisory ratings, genre, etc. In the case of scheduled services, the service guide data may also provide information about the date and time each offering is scheduled to broadcast. The service guide data may also be transmitted by the service provider 10 along with the one or more services.

FIG. 5A illustrates an exemplary URI message. The URI message may include the URL information described above according to one embodiment. The URI message is used to deliver information for URLs of various types and may be sent in fragments. As illustrated in FIG. 5A, the URI message may include the following fields:

uri_type—an 8-bit unsigned integer field that identifies the type of URI to follow according to the table illustrated in FIG. 5B for example.

entity_strlen—an 8-bit unsigned integer that signals the number of characters in the entity_string( ) to follow.

entity_string( )—a string containing an IANA-registered domain name including at least a top-level domain and a second-level domain. Higher level domains may be present. Period characters (".") may be included between the top-level, second-level, and any higher level domains. As noted above, other unique values may be used in place of or in addition to the registered domain name in certain embodiments.

uri_strlen—an 8-bit unsigned integer that signals the number of characters in the uri_string( ) to follow.

URI_string( )—a URI including characters whose values are restricted to those allowed for URIs by RFC 3986, which is incorporated herein by reference in its entirety.

For example, as described above, the reception apparatus 20 is expected to form the URL it will use to retrieve reference content and report data. By having the reception apparatus 20 form the URL, a security issue involved with the possible tampering of watermarks or other part of a data stream provided to the reception apparatus 20 to cause unauthorized URLs to be signaled in the uri_message (any other message) can be addressed.

In one embodiment, the reception apparatus 20 forms the URL by prepending the entity_string, with the string ".vp1.tv/" followed by the URI_string string if applicable. The URL should be a valid URL per RFC 3986. In one embodiment, the URL contains only the URI syntax components of path, query, and fragment per RFC 3986. The URI_string( ) may be used to construct an HTTPS request as follows: "https://<entity>.vp1.tv/<URI_string( )". However, the URI_string may not be required if the entity_string provided can uniquely identify the referenced content or destination of the data to be reported in one embodiment.

FIG. 5B illustrate exemplary types of URIs that can be identified by the field uri_type. Other possibilities include a path to application packages associated with the current program.

Figure 6:
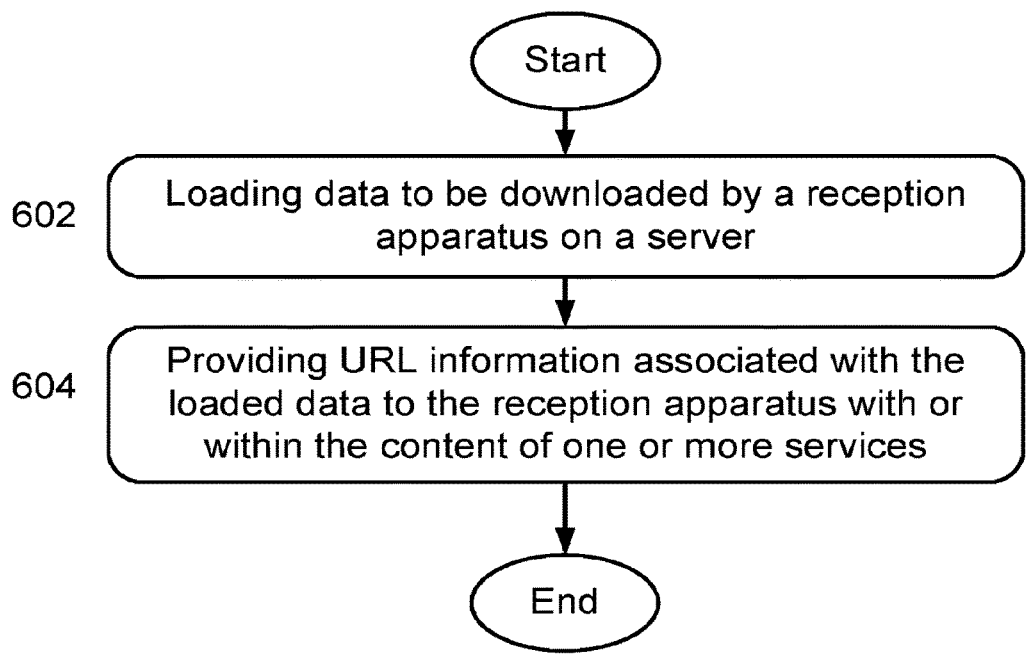
FIG. 6 illustrates a method for providing URL information to the reception apparatus according to one embodiment.

FIG. 6 provides an overview of an exemplary method of the service provider 10 for causing the reception apparatus 20 to communicate with a server to download (or otherwise acquire) data. In step 602, the service provider 10 loads the data to be acquired by the reception apparatus 20 in a server. In one embodiment, an address associated with the server is known (e.g., previously registered) to a trusted operator linked to the domain name identified in the predetermined URL information described above. For example, the service provider 10 may have previously registered the sub-domain "fbc.com" with the trusted provider, which causes the URL "https://fbc.com.vp1.tv" to be redirected to the server operated by the service provider or fbc.com. Further, the service provider 10 may store the data in a path that is associated with specific content.

In step 604, the service provider 10 provides URL information associated with the loaded data to the reception apparatus 20 with or within the content of one or more services. For example, the URL information inserter 354A of the service provider 10 inserts the URL information in a caption portion, video portion, or audio portion of the content (e.g., MP 1 in FIG. 3). The URL information inserter 354A inserts a watermark containing the URL information in the audio or video portion according to one embodiment. The URL information may include the registered sub-domain and the path in which the data is stored on the server. The path information may also be separate from the URL information. In certain embodiments, the URL information may be provided in information downloaded from a server. For example, downloaded emergency alert information may contain URL information used to generate a URL to download a CAP message, or an application manifest file may contain URL information used to generate a URL to download an application or application package.

In one embodiment, to cause the reception apparatus 20 to upload data to the service provider 10, the service provider 10 need not load data in the server, as described above with respect to step 602. Instead, the service provider 10 designates a location or file within the server to which data uploaded to the service provider 10 is stored. In this case, the URL information transmitted to the reception apparatus 20 in step 604 may include a path in which the data is to be stored. The path information may also be separate from the URL information as in the case of the URL information used to download data.

As noted above, the predetermined URL information may be "vp1.tv". However, any other valid registered domain names could be selected for the predetermined URL information. Further, different predetermined domain names may be selected based on whether data is to be downloaded or uploaded, or based on the type of data to be downloaded or uploaded, according to certain embodiments. When the registered domain name, value, or other unique identifier, is registered as a subdomain of a trusted domain name for redirect, an operator of the trusted domain name or server used by the operator for the registration process may verify the validity of the registration in one embodiment. For example, the trusted operator or server can perform a look up of the registered domain name using the following https request "https://whois.icann.org/en/lookup?name=fbc.com" where the string "fbc.com" identifies the registered domain name. In another embodiment, the trusted operator or server may limit redirects to a domain or IP address having a known association with the registered domain name. Similar look up processes or limitations on redirects can be implemented for the other registered values or unique identifies described above.

Figure 7:
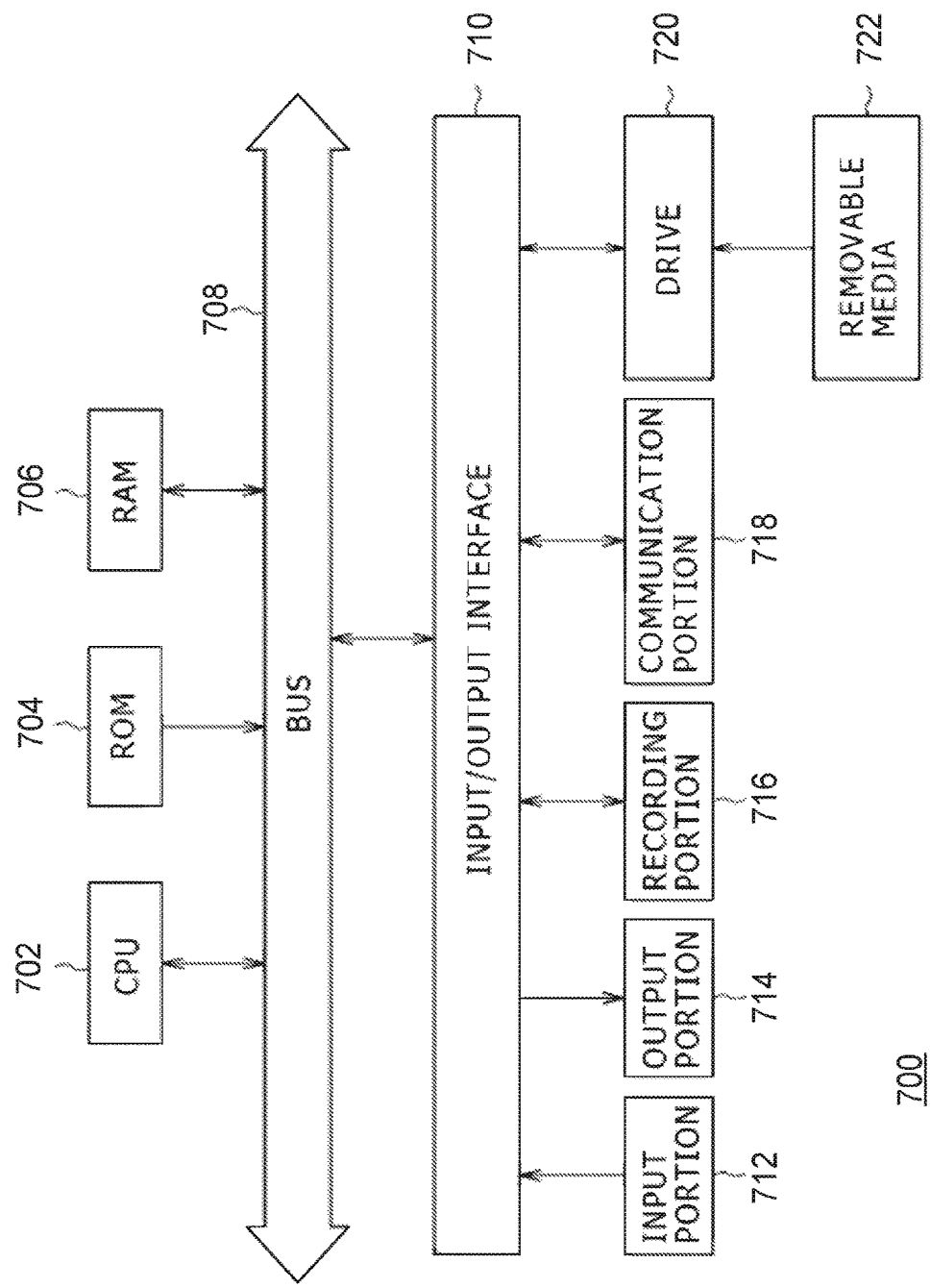
FIG. 7 is an exemplary computer.

FIG. 7 is a block diagram showing an example of a hardware configuration of a computer 700 configured to function as, or control, any one or a combination of the service provider 10 (e.g., information providing apparatus 352), reception apparatus 20, and/or the one or more servers 40.

As illustrated in FIG. 7, the computer 700 includes CPU 702, ROM (read only memory) 704, and a RAM (random access memory) 706 interconnected to each other via one or more buses 708. The one or more buses 708 is further connected with an input-output interface 710 (e.g., USB (Universal Serial Bus) interface). The input-output interface 710 is connected with an input portion 712 formed by a keyboard, a mouse, a microphone, remote controller, etc. The input-output interface 710 is also connected to a output portion 714 formed by an audio interface (e.g., analog-to-digital converter), video interface (e.g., video card), display, speaker, etc.; a recording portion 716 formed by a hard disk, a non-volatile memory, etc.; a communication portion 718 formed by a network interface, modem, USB interface, FireWire interface, etc.; and a drive 720 for driving removable media 722 such as a magnetic disk, an optical disk, a magneto-optical disk, a semiconductor memory, etc.

According to one embodiment, the CPU 702 loads a program stored in the recording portion 716 into the RAM 806 via the input-output interface 710 and the bus 708, and then executes a program configured to provide the functionality of the one or combination of the service provider 10, reception apparatus 20, and one or more servers 40.

The various processes discussed above need not be processed chronologically in the sequence depicted as flowcharts; the steps may also include those processed parallelly or individually (e.g., in paralleled or object-oriented fashion).

Also, the programs may be processed by a single computer or by a plurality of computers on a distributed basis. The programs may also be transferred to a remote computer or computers for execution.

Furthermore, in this specification, the term "system" means an aggregate of a plurality of component elements (apparatuses, modules (parts), etc.). All component elements may or may not be housed in a single enclosure. Therefore, a plurality of apparatuses each housed in a separate enclosure and connected via a network are considered a network, and a single apparatus formed by a plurality of modules housed in a single enclosure are also regarded as a system.

Also, it should be understood that this technology when embodied is not limited to the above-described embodiments and that various modifications, variations and alternatives may be made of this technology so far as they are within the spirit and scope thereof.

For example, this technology may be structured for cloud computing whereby a single function is shared and processed in collaboration among a plurality of apparatuses via a network.

Also, each of the steps explained in reference to the above-described flowcharts may be executed not only by a single apparatus but also by a plurality of apparatuses in a shared manner.

Furthermore, if one step includes a plurality of processes, these processes included in the step may be performed not only by a single apparatus but also by a plurality of apparatuses in a shared manner.

Numerous modifications and variations of the embodiments of the present disclosure are possible in light of the above teachings. It is therefore to be understood that within the scope of the appended claims, the embodiments may be practiced otherwise than as specifically described herein.

The above disclosure also encompasses the embodiments noted below.

(1) A method of a reception apparatus for communicating with a server to download or upload data. The method includes receiving a URI (Uniform Resource Identifier) message. The URI message includes a DNS (Domain Name System) name registered with the IANA (Internet Assigned Numbers Authority). The method includes generating a URL (Uniform Resource Locator) based on the registered DNS name included in the received URI message and a predetermined domain name. The method further includes downloading the data from, or uploading the data to, the server using the generated URL. The predetermined domain name includes a top-level domain name and a second-level domain name of the URL.

(2) The method according to feature (1), in which the registered DNS name includes at least one lower-level domain name of the URL. The at least one lower-level domain name is subordinate to the second-level domain name.

(3) The method according to feature (1) or (2), further including extracting the URI message from an audio or a video watermark embedded in the content.

(4) The method according to any of features (1) to (3), in which the URI message includes a URI type and a URI string. The step of generating the URL includes generating the URL based on the registered DNS name included in the received URI message, the URI string included in the received URI message, and the predetermined domain name. The step of acquiring or transmitting includes determining whether to download or upload the data based on the URI type included in the URI message.

(5) The method according to feature (4), in which the URI type indicates that the URL corresponds to a signaling server, an electronic service guide server, a service usage data gathering report server, an emergency information server, or an application manifest server.

(6) The method according to any of features (1) to (5), further including receiving a digital television broadcast signal that includes content and the URI message, and outputting the received content for display to a user, in which the data is an application to be executed in synchronization with the displayed content.

(7) A non-transitory computer-readable medium storing instructions which when executed by a computer cause the computer to perform the method of any of features (1) to (6).

(8) A reception apparatus, including circuitry configured to receive a URI (Uniform Resource Identifier) message. The URI message includes a DNS (Domain Name System) name registered with the IANA (Internet Assigned Numbers Authority). The circuitry is configured to generate a URL (Uniform Resource Locator) based on the registered DNS name included in the received URI message and a predetermined domain name. The circuitry is configured to download the data from, or upload the data to, the server using the generated URL. The predetermined domain name includes a top-level domain name and a second-level domain name of the URL.

(9) The reception apparatus according to feature (8), in which the registered DNS name includes at least one lower-level domain name of the URL. The at least one lower-level domain name is subordinate to the second-level domain name.

(10) The reception apparatus according to feature (8) or (9), in which the circuitry is configured to extract the URI message from an audio or a video watermark embedded in the content.

(11) The reception apparatus according to any of features (8) to (10), in which the URI message includes a URI type and a URI string, and the circuitry is further configured to generate the URL based on the registered DNS name included in the received URI message, the URI string included in the received URI message, and the predetermined domain name, and determine whether to download or upload the data based on the URI type included in the URI message.

(12) The reception apparatus according to feature (11), in which the URI type indicates that the URL corresponds to a signaling server, an electronic service guide server, a service usage data gathering report server, an emergency information server, or an application manifest server.

(13) The reception apparatus according to any of features (9) to (12), further including a receiver configured to receive a digital television broadcast signal that includes content and the URI message, in which the circuitry is configured to output the received content for display to a user, and the data is an application to be executed in synchronization with the displayed content.

The invention claimed is:

1. A method of a reception apparatus for communicating with a server to download or upload data, the method comprising:
receiving a digital television broadcast signal that includes content and a URI (Uniform Resource Identifier) message, the URI message including a URI type and a DNS (Domain Name System) name registered with the IANA (Internet Assigned Numbers Authority);
generating a URL (Uniform Resource Locator) based on the registered DNS name included in the received URI message and a predetermined domain name;
downloading data from the server using the generated URL when the URI type included in the received URI message includes a first value; and
uploading data to the server using the generated URL when the URI type included in the received URI message includes a second value, wherein
the predetermined domain name includes a top-level domain name and a second-level domain name of the URL.

2. The method according to claim 1, wherein the registered DNS name includes at least one lower-level domain name of the URL, the at least one lower-level domain name being subordinate to the second-level domain name.

3. The method according to claim 1, further comprising:
extracting the URI message from an audio or a video watermark embedded in the content.

4. The method according to claim 1, wherein
the URI message includes a URI string, and
the step of generating the URL includes generating the URL based on the registered DNS name included in the received URI message, the URI string included in the received URI message, and the predetermined domain name.

5. The method according to claim 1, wherein the URI type indicates that the URL corresponds to a signaling server, an electronic service guide server, a service usage data gathering report server, an emergency information server, or an application manifest server.

6. The method according to claim 1, further comprising:
outputting the received content for display to a user, wherein
the data is an application to be executed in synchronization with the displayed content.

7. A non-transitory computer-readable medium storing instructions which when executed by a computer cause the computer to perform a method for communicating with a server to download or upload data, the method comprising:
receiving a digital television broadcast signal that includes content and a URI (Uniform Resource Identifier) message, the URI message including a URI type and a DNS (Domain Name System) name registered with the IANA (Internet Assigned Numbers Authority);
generating a URL (Uniform Resource Locator) based on the registered DNS name included in the received URI message and a predetermined domain name;
downloading data from the server using the generated URL when the URI type included in the received URI message includes a first value; and
uploading data to the the server using the generated URL when the URI type included in the received URI message includes a second value, wherein
the predetermined domain name includes a top-level domain name and a second-level domain name of the URL.

8. The non-transitory computer-readable medium according to claim 7, wherein the registered DNS name includes at least one lower-level domain name of the URL, the at least one lower-level domain name being subordinate to the second-level domain name.

9. The non-transitory computer-readable medium according to claim 7, further comprising:
extracting the URI message from an audio or a video watermark embedded in the content.

10. The non-transitory computer-readable medium according to claim 7, wherein
the URI message includes a URI string, and
the step of generating the URL includes generating the URL based on the registered DNS name included in the received URI message, the URI string included in the received URI message, and the predetermined domain name.

11. The non-transitory computer-readable medium according to claim 7, wherein the URI type indicates that the URL corresponds to a signaling server, an electronic service guide server, a service usage data gathering report server, an emergency information server, or an application manifest server.

12. The non-transitory computer-readable medium according to claim 7, further comprising:
outputting the received content for display to a user, wherein
the data is an application to be executed in synchronization with the displayed content.

13. A reception apparatus, comprising:
circuitry configured to
receive a digital television broadcast signal that includes content and a URI (Uniform Resource Identifier) message, the URI message including a URI type and a DNS (Domain Name System) name registered with the IANA (Internet Assigned Numbers Authority);
generate a URL (Uniform Resource Locator) based on the registered DNS name included in the received URI message and a predetermined domain name;
download data from a server using the generated URL when the URI type included in the received URI message includes a first value; and
upload data to the the server using the generated URL when the URI type included in the received URI message includes a second value, wherein
the predetermined domain name includes a top-level domain name and a second-level domain name of the URL.

14. The reception apparatus according to claim 13, wherein the registered DNS name includes at least one lower-level domain name of the URL, the at least one lower-level domain name being subordinate to the second-level domain name.

15. The reception apparatus according to claim 13, wherein the circuitry is configured to
extract the URI message from an audio or a video watermark embedded in the content.

16. The reception apparatus according to claim 13, wherein
the URI message includes a URI string, and
the circuitry is further configured to
generate the URL based on the registered DNS name included in the received URI message, the URI string included in the received URI message, and the predetermined domain name.

17. The reception apparatus according to claim 13, wherein the URI type indicates that the URL corresponds to a signaling server, an electronic service guide server, a service usage data gathering report server, an emergency information server, or an application manifest server.

18. The reception apparatus according to claim 13, wherein
the circuitry is configured to output the received content for display to a user, and
the data is an application to be executed in synchronization with the displayed content.

19. The method according to claim 4, wherein the URI type is an 8-bit unsigned integer that identifies a type of the URI string.

20. The method according to claim 19, wherein, in the URI message, the URI type precedes the DNS name and the URI string.

* * * * *